INVENTOR:
PATRICK E. CAVANAGH
BY:
Cavanagh & Norman

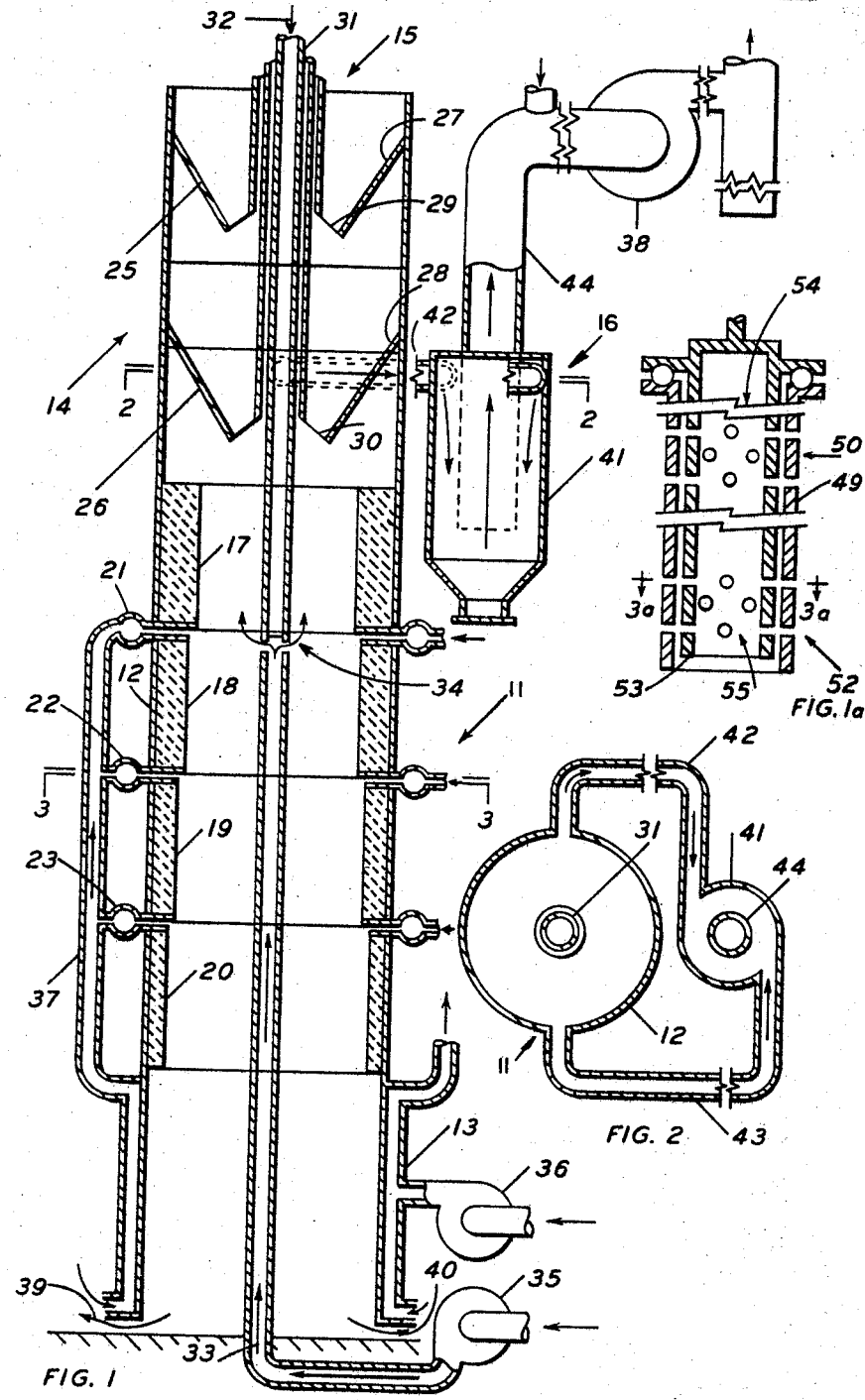

INVENTOR:
PATRICK E. CAVANAGH
BY:
Cavanagh & Norman

Inventor
PATRICK E. CAVANAGH
by: *Cavanagh & Norman*

United States Patent Office 3,427,013
Patented Feb. 11, 1969

3,427,013
LOW TEMPERATURE BLAST FURNACE AND METHOD THEREFOR
Patrick Edgar Cavanagh, Montreal, Quebec, Canada, assignor, by mesne assignments, to Steep Rock Iron Mines Limited, Ontario, Canada
Filed Sept. 8, 1966, Ser. No. 578,067
U.S. Cl. 266—29      8 Claims
Int. Cl. F27d; C22b 9/14; F27b 1/00

ABSTRACT OF THE DISCLOSURE

A low temperature blast furnace with a shaft defined by a sheel has a plurality of concentric annular refractory linings which provide a plurality of zones each of reduced diameter relative to the previous zone and decreasing towards the top; means are provided to introduce combustion air at the steps formed by the refractories. An airtube concentric with the furnace provides communication of gases into and between the zones and serves together with the lining to define a charge space. A charge of ore and reduction material, the latter being an excess of that required for complete reduction, are loaded into the top of the furnace. During combustion the charge and the reduction material are successively moved through controlled zones specifically through a preheat, a reduction and a cooling zone; a portion of the reducing gases being forced through the cooling zone to maintain a non-oxidizing atmosphere.

---

This invention relates to improvments in methods for the reduction of iron ore and to a low temperature blast furnace using such methods.

The reduction of iron ores is normally carried out in blast furnaces wherein the ore is mixed with a suitable reducing agent, such as for instance coke, and together with certain additives reduced to molten iron which is drawn off the bottom of the furnace. In the process the coke and ore are fed into the top of a vertical column and air is introduced at the bottom, a certain maximum temperature being reached at a point within the furnace in the hearth at which the iron is completely molten and below which the liquid iron is drawn from the furnace at a temperature of about 3000° F. The reduction of iron takes place partly in the upper region of the furnace where the temperature is about 2000° F.

In the case of some high grade iron ores, it is practical to reduce them to metallic iron and obtain a useable product for certain purposes without melting the metallic iron. This product is called sponge iron if the content of metallic iron is about 90% or more and is called metallized ore if the iron content is between 70% and 85%. In this latter case the contained oxygen in the original iron oxide ore has been removed to the extent of between 65% and 80%.

Many methods exist for making partially reduced or metallized ore and in some specific cases shaft furnaces are used for reducing coarse ore or agglomerated ore. In these cases, a hot reducing gas is made outside the shaft furnace and introduced to the bottom of the furnace. The metallic iron product is cooled and discharged in the solid state from the furnace.

It is an object of the present invention to provide method and apparatus for the reduction of iron ore to metallized iron. In general the method is to reduce the iron ore partially to the degree desired by controlling the combustion and therefore the maximum temperature reached in the shaft furnace through controlled combustion of carbonaceous material such as coal, coke or lignite and controlling the gas composition rising through the shaft furnace above the actual combustion zones therein to a comparatively high ratio of carbon monoxide to carbon dioxide. The volatile materials from the carbonaceous material used are burnt above the ore reduction zone to provide preheating of the charge and the charge below the reduction zone is cooled before discharge from the shaft furnace to prevent re-oxidation this being accomplished by the presence of residual carbon in the charge which after discharge may be separated from the reduced ore.

In contrast to other methods of reduction, a large excess of carbonaceous material is deliberately charged along with the ore so that from one-third to two-thirds remains unburned on discharge and is recycled to the shaft furnace. Successful operation requires careful and controlled burning of only a portion of the carbonaceous material present in the charge in such a way that the temperature does not rise above a desired maximum and the combustion gas, just above the combustion zone, is a strong reducing gas with better than a 7/1 ratio of $CO/CO_2$.

A novel feature of the low temperature furnace is the provision of a positive pressure, as compared to ambient, inside the furnace in order that the controlled atmosphere within the furnace persists to the discharge point thus eliminating any necessity for sealing the bottom of the furnace and thus assisting in discharge of the reduced ore therefrom. By suitably controlling pressures within the furnace a small flow of reducing atmosphere is forced down through the charge below the reduction zone to maintain the reduced ore in this state thus to prevent reoxidation.

It is a further object of this invention to provide a low temperature blast furnace having fluid transfer means located centrally thereof whereby an annular charge is provided within the furnace. Due to the provision of both an inner wall and an outer wall to define the annularly shaped charge the gas penetration is deeper than would otherwise be the case for a conventional shaft furnace thus allowing a furnace of larger diameter than has been possible heretofore.

Other objects and features of the invention will be apparent from the following detailed description and accompanying drawings in which like numerals refer to like parts, and in which:

FIGURE 1 is a mid sectional view of a shaft furnace according to the present invention, FIGURE 1a is a part sectional view through an alternative form of air supply means for the central tube of the shaft furnace;

FIGURE 2 is a section along the line 2—2 of FIGURE 1;

FIGURE 3a is a section on the line 3a—3a of FIGURE 1a;

Figure 3:
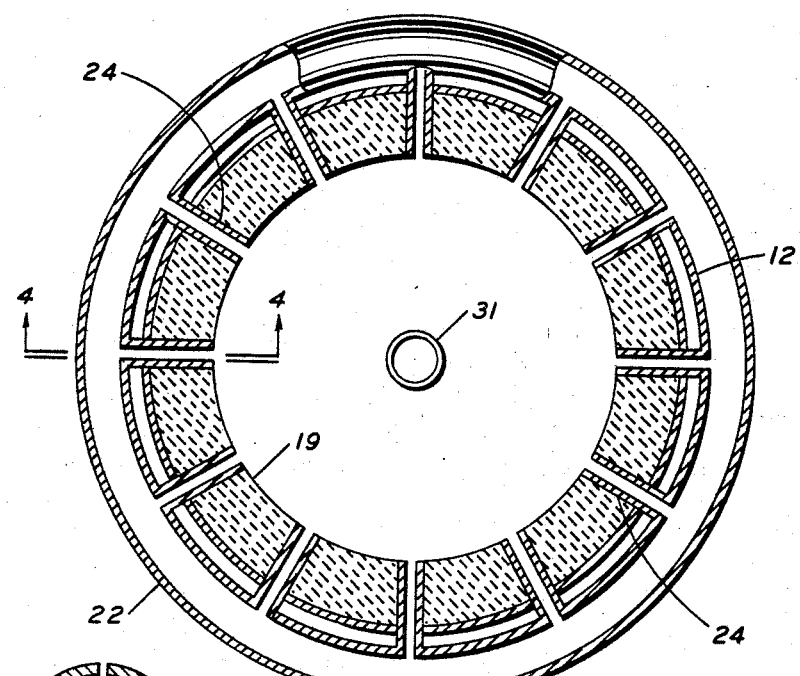
FIGURE 3 is a section along the line 3—3 of FIGURE 1.

Referring to FIGURE 1, FIGURE 2, and FIGURE 3 apparatus suitable for use with the present invention is illustrated and comprises a low temperature blast furnace indicated generally as 11. In general the shaft furnace 11 comprises an outer casing 12, cooling jacket 13 around the lower portion thereof, charging hoppers indicated at 14, air introducing pipes at 15, and waste gas system indicated at 16.

The casing 12 is of cylindrical configuration and is provided with the refractory linings, in steps, these being linings 17, 18, 19, and 20 of gradually increasing diameters. At the step formed by the intersection of adjacent linings combustion air is supplied from the pipes 21, 22, and 23 into the interior of the furnace. The air is conveyed from the circular pipes through the furnace walls by means of the short tubes 24 as shown in FIGURE 3. The arrangement as shown in FIGURE 3 is typical for all 3 positions of the air pipes 21, 22, and 23.

As indicated at 14 a double hopper, comprising upper hopper assembly 25 and lower hopper assembly 26 is provided in the upper portion of the shaft furnace 11 in order that the charge of ore and reduction material can be added while still maintaining the positive pressure within the furnace 11. The hoppers 25 and 26 are of conventional design, the cone portions 27 and 28 respectively leading into the drop cones 29 and 30 which move downwardly by suitable mechanical means to discharge the ore into the lower portion of furnace 11.

As indicated at 15 a central pipe 31 is positioned centrally of the furnace 11 whereby combustion air may be fed into the annular charge within the furnace. The air may be introduced into the pipe under pressure either at the top as shown by the arrow 32 or the bottom as shown by the arrow 33 depending upon the amount of preheat required for the air which may thereafter be introduced through the vents as shown at 34 to aid in combustion. Suitable air blast fans can be provided for introducing the air into pipe 31 such as for instance the fan 35.

The air supplied to the pipes 21, 22, and 23 is first of all preheated by means of the jacket 13 and is supplied under pressure by means of the blast fan 36. The piping assembly 37 distributes the preheated air from the jacket 13 to the inlet piping where the air is finally forced into the furnace through the small pipes 24. While a charge is in the furnace a suction is maintained in the upper portion of the furnace by means of the exhaust fan 38. Thus by adjusting the inlet flow through fans 35 and 36 and by the exhaust fan 38 a positive pressure is maintained within the furnace 11. As a result a small portion (approximately 5%) of gas flow, which is a reducing gas, is forced downwardly in the furnace to exit as at 39 and 40 about the base of the furnace. Most of the waste gases however, are taken out through the exhaust fan 38 which is provided with a dust separator 41 operating in known manner. The piping 42 and 43 leads from the furnace 11 into the separator 41 which exhausts through the piping 44 and fan 38.

Figure 4:
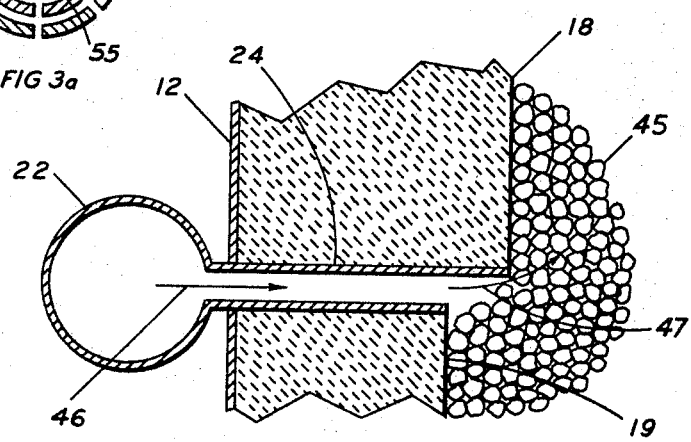
FIGURE 4 is a section along the line 4—4 of FIGURE 3.

Referring to FIGURE 4 an enlarged detail of the air blast means is shown wherein the pipe 22 supplies air through the pipe 24 into the furnace containing the charge 45. The air directed into the furnace as represented by the arrow 46 is forced inwardly and upwardly as indicated by the arrow 47 by means of the step formed by the refractory linings 18 and 19. Thus the gases are directed toward the centre of the charge and not allowed to travel up the inner wall surface of the linings, the net effect being an even distribution of reducing gases throughout the charge. In order to provide uniform combustion within the furnace an air flow of at least 125 ft./min. should be maintained through the tubes 24.

Figure 3A:
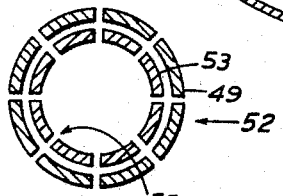

Referring to FIGURES 1a and 3a an alternative form of air supply means for the central region of the shaft furnace is illustrated. In this embodiment the air tube 49 which extends substantially the length of the furnace in a position similar to the pipe 31, is provided with a plurality of air holes at 50 in the upper region and at 52 in the lower region, whereby air is distributed into different parts of the furnace depending upon the type of operation being carried out. A centre tube 53 serves as a valve within the pipe or tube 49 and is provided with a plurality of holes as at 54 and 55 which match the hole pattern and position as indicated at 50 and 52. By suitably altering the relative axial position of pipe 53 and pipe 49 the individual hole patterns will be brought into registration thus allowing more air to pass therethrough. In this manner the air distribution to various parts of the furnace for different processes and for different steps in the processes can be varied and controlled.

The use of a central pipe or tube permits the use of a comparatively larger diameter shaft furnace than would otherwise be the case without the centre air tube feed. The penetration of air blast into the charge is limited and by introducing air centrally of the furnace the effective width covered can be increased so that a much larger diameter furnace can be used. The centre pipe can be used as a means for feeding fuel or preheated air into the annular furnace charge and in addition can be used for withdrawing gases in certain areas to be utilized in other areas of the furnace.

It is contemplated to utilize high temperature alloys for the construction of the pipes 49 and 53 in order to withstand the comparatively high temperatures to which the device will be subjected. Other types of high temperature materials such as for instance ceramics can also be resorted to as construction material in the high temperature areas.

It should be noted here that the holes may be slots or specially shaped holes through the pipes if so desired, and are sized to be in diameter equal to or greater than the mean effective through path diameter through the burden within the furnace so that the velocity through a part of the charge does not exceed dusting velocity. Critical dusting velocity is reached when the velocity value reaches approximately 4 f.p.s. S.T.P.

The diameter of the inner air tube is preferably not less than $\frac{1}{10}$ the diameter of the furnace and may be as much as $\frac{1}{2}$ the inner diameter of the furnace, this diameter being the inner diameter at the combustion zone. The lesser diameter is to be preferred when the central pipe is used only for the introduction of heated combustion air to the combustion zone from the cooling zone. The preferred diameter ratio depends upon the process being carried out in the furnace and the amount of cooling air and combustion air being transmitted by the central tube in comparison to the amount which is introduced from outside the furnace shell. In addition, the proportion of extra fuel in the form of gaseous or liquid fuel will affect the centre tube diameter relative to the furnace diameter.

In addition to aiding in the distribution of combustion air into the furnace the stepped refractory linings 17, 18, 19 and 20 also aid in reducing the furnace height for a particular installation. There is an approximate decrease of 10% in the furnace diameter from the combustion zone at the bottom of the furnace through each successive stage of stepping of the refractory whereby at the highest zone or zone 1 the inner diameter of the furnace is approximately 60% of the inner diameter at the bottom of the furnace. With this method of construction the rate of travel of the burden down the furnace is slowed as it descends so that more time is given as required in the final reduction zone and the cooling zone in particular without having the furnace grow to an impractical height.

Figure 5:
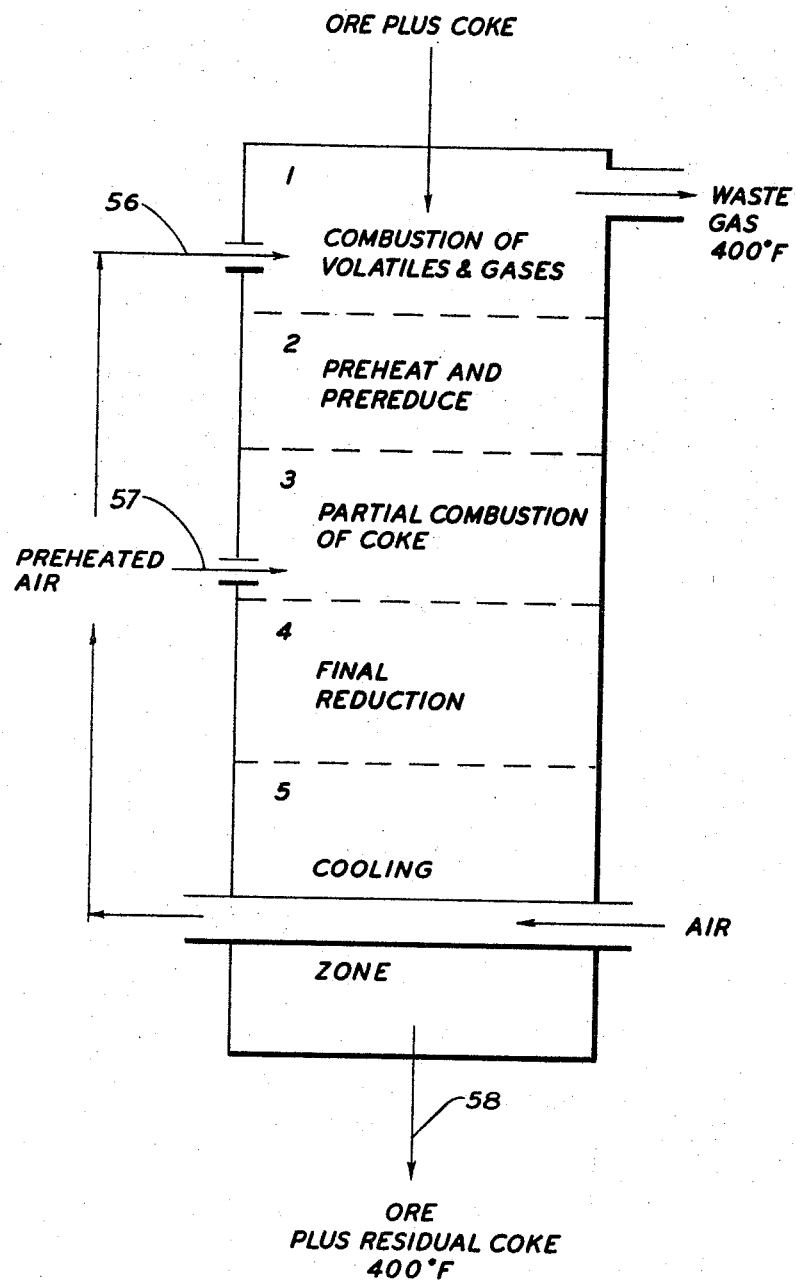
FIGURE 5 is a diagrammatic chart of the various combustion zones within the shaft furnace when being utilized according to the present invention.

In FIGURE 5 the method according to the present invention for the production of metallized ore is shown in diagrammatic form.

In the low temperature blast furnace the ore is brought to the desired reduction temperature and held for sufficient time for reduction to take place, whereafter the charge is cooled to a temperature below which it will not reoxidize when exposed to air. In general the higher reduction temperatures will result in a product less likely to oxidize at any given discharge temperature.

In FIGURE 5 the conditions existing at the various levels within the shaft furnace are illustrated and it will be seen that ore and coke in the required weight ratio are fed into the top of the furnace where they encounter the waste gas at approximately 400° F. In zone 1 the combustion of volatiles and gases takes place by the introduction of preheated air as at 56. In zone 2 preheat of the ore and coke mixture is achieved, with some pre-reducing of the ore taking place at this stage.

In zone 3 the coke is partially combusted by introduction of preheated air at a controlled rate as at 57, the maximum temperature in this zone being preferably about 2000° F. Thus by careful control of the preheated air injected at this point relative to the available coke in this zone the temperature of zone 3 can be controlled. In zone 4 final reduction takes place wherein remaining oxygen up to a total of approximately 75% of oxygen is removed, the ore being held within zone 4 for final reduction for a predetermined time. The cooling of the ore takes place in zone 5 before the ore plus residual coke is finally discharged as at 58 at a temperature of approximately 400° F. The metallized ore which is in the same shape as the original ore, and residual uncombusted coke is discharged, whereafter the reduced ore and coke can be separated by for instance magnetic separators. The unburned coke is recirculated into the top of the furnace for use as before.

The combustion gas from zone 3 must rise through the furnace and no air must be admitted through the bottom of the furnace. To maintain a very slight downward flow of combustion gas through zones 4 and 5 and out the bottom of the furnace pressure in zone 3 must be controlled. This is achieved by controlling the charge porosity by careful sizing of both the ore and coke and controlling the pressure in zone 3 and suction in zone 1. The cooling air, and therefore the preheated air entering zone 3 must be under positive pressure sufficient to overcome the pressure differential between zone 3 and the discharge of the furnace due to the presence of hot gases within the furnace.

To ensure that combustion gases are directed mainly upward through the shaft, a suction must be provided at the waste gas outlet. A pressure balance must be maintained between the preheated air inlets in zones 3 and 1 and the outlet suction so that the result is a slight positive pressure downward from zone 3 through zone 5 and sufficient updraft from zone 3 through zones 2 and 1 to ensure that 95% (or better) of the combustion gases will rise through the upper part of the shaft and be discharged as waste gas.

The preferred maximum temperature in the shaft furnace when making metallized ore is 2400° F. The furnace must be operated in such a manner that the combustion air entering zone 3 is introduced through a large number of small nozzles as shown in FIGURE 3 so that combustion takes place rapidly and the rising gas contacting the next higher charge is non-oxidizing to hot metallic iron and is mainly nitrogen, carbon monoxide and combustion products. In zone 1 preheated combustion air is introduced through many small combustion nozzles to the charge. Carbon monoxide, hydrogen and volatile hydrocarbons are burned to produce carbon dioxide and water vapour and to preheat the descending charge. Waste gases from the furnace have no further calorific value and are very low in carbon monoxide, hydrogen and hydrocarbons.

Figure 6:
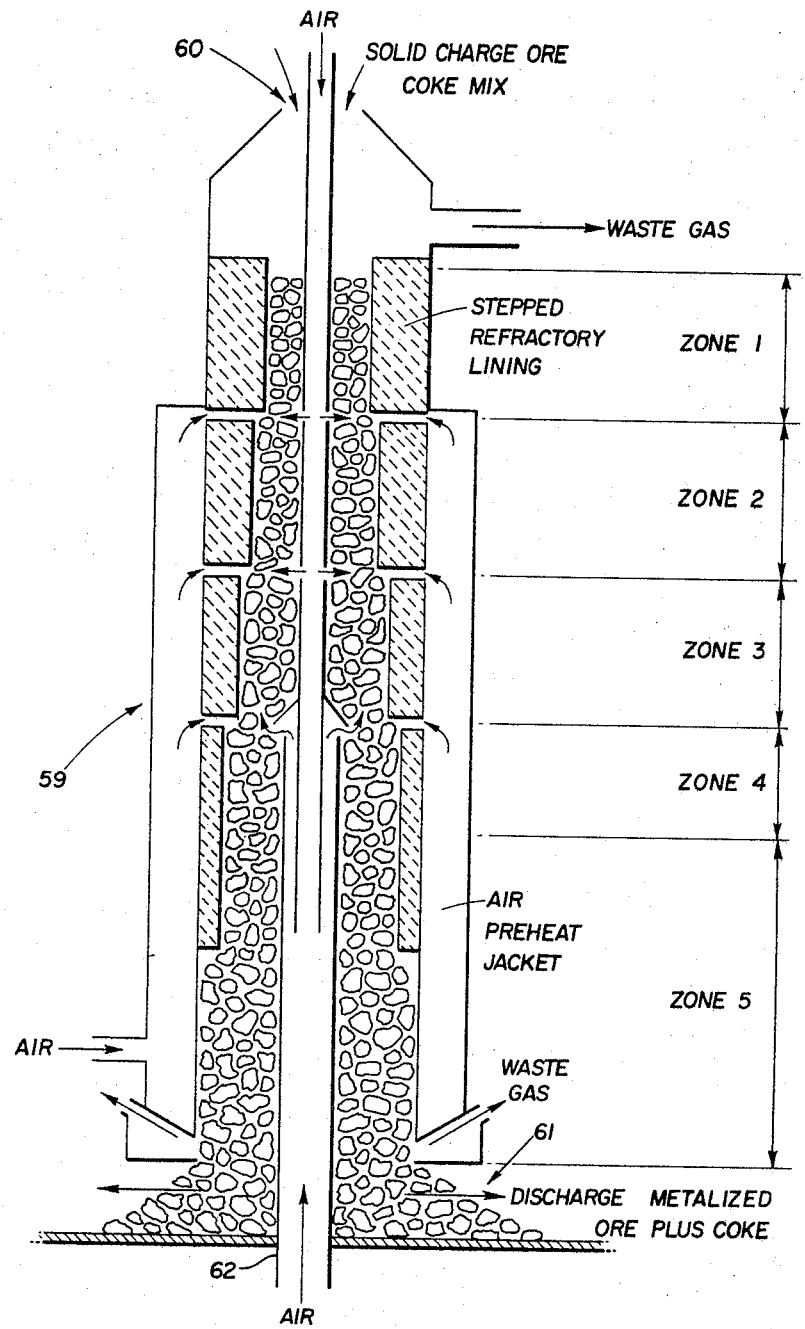
FIGURE 6 is a diagrammatic representation of a furnace wherein gaseous fuel is added to the solid fuel charge.

In FIGURE 6 the method for producing metallized ore according to the present invention is shown in diagrammatic form wherein an annular shaft furnace indicated generally as 59 is provided which is similar to the furnace as illustrated in FIGURE 1 the charge after reduction being cleared away from the open base of the furnace by suitable means such as for instance by a motor operated plow. The charge in the form of a mixture of ore and coke is introduced at 60 at the top of the furnace and progresses gradually down through the zones of the furnace where pre-heating and reduction takes place to exit at 61 at the base of furnace.

When a controlled combustion shaft furnace is used for making metallized ore, the maximum temperature in zone 3 is about 2400° F. and the degree of reduction is only about 66% to 75%. When iron ore is reduced to this extent, it re-oxidizes very slowly under normal atmospheric conditions so that it can be stockpiled, handled and shipped in the same way as ordinary iron ore.

The relatively low degree of reduction and the high reduction temperature result in a material which does not re-oxidize easily, even in the high temperature zone of the controlled combustion shaft furnace. As shown in FIGURE 6, the ore and coke in the proper proportions are mixed together and charged as a uniform mixture. Preheated combustion air is also introduced through the central air tube 62. The bottom of the shaft is open to the atmosphere but the slight positive pressure existing in zone 5 and established by a pressure balance maintains a slow flow of hot reducing gas down the shaft. The presence of this hot gas inside the furnace effectively prevents entrance of air and re-oxidation of the iron. The mixture of the residual coke and the metallized ore, both cooled to about 400° F., can be discharged into the open air by means of a rotary plow operating in the space below the furnace shaft.

The positive slow flow of waste reducing gas down the furnace escapes through burner ports at the skirt of the shaft and is burned. The mixture of metallized ore and residual coke is passed over magnetic separators and the coke is re-cycled to be mixed with ore for further charging of the furnace.

In areas where natural gas or propane are particularly cheap or where fuel oil or naphtha is available at lower costs than solid carbonaceous fuel, then some portion of the fuel requirement of the controlled combustion shaft furnace can be supplied by a liquid or gaseous fuel.

A fuel tube from the top of the furnace conducts natural gas and air to the combustion zone. At this point, a central tunnel burner is fed with natural gas and an excess of air to give high temperature combustion. Excess secondary natural gas is fed around this burner flame. When mixed with the high temperature combustion gases the secondary gas is broken down to carbon monoxide and hydrogen with a small residual amount of methane. The resulting reducing gas rises through the coke and ore charge and performs the same functions as the reducing gas generated when only solid fuel is used.

The fuel tube from the top of the furnace is preferably at least one-third of the inside furnace diameter so that the charge forms around an open pocket at the central tube providing combustion space.

In use the present method can be used to provide metallized ore by utilizing a shaft furnace as disclosed in FIGURE 1. According to the present invention the temperature must be controlled by keeping the ratio between combustion air and coke within specific limits in the controlled combustion shaft furnace. It is, therefore, possible to calculate results to be expected from any given set of conditions.

The low temperature blast furnace is a coke burning machine and the amount of coke burned per unit time is dependent on the rate of air supply to the furnace. This, in turn, determines the amount of heat available to do work in unit time and therefore the output of the furnace.

For best heat efficiency there is a minimum gas contact time within the furnace of about five seconds in order to achieve efficient heat transfer. The charge in the annular shaft furnace is sized to give maximum porosity and therefore minimum gas velocity within the furnace which results in maximum gas contact time in any given height of the furnace. For this reason the charge is sized so that the largest particles in the furnace at any one time is about twice the diameter of the smallest particles at any one time. This size range applies both for ore and coke in the annular charge.

A major difference in operation to any other furnace is the proximity factor. When a carbonaceous fuel is being burned, then the distance between particles is a governing factor in determining the lowest temperature at which combustion will proceed efficiently. This can be easily seen when burning logs in a fireplace when quartered logs can be adjusted so that the distance between parallel faces will determine whether or not the first continues burning. In the same way, when a carbonaceous fuel, such as coke, is mixed with and separated by iron ore particles of the same size, there is a maximum distance between coke particles at which satisfactory combustion will be maintained.

For coke/ore mixtures with a diameter ratio of two to one between the largest and smallest particle and in a size range of 1" to ⅛" this proximity factor is about equal to one diameter. That is, if quarter inch coke particles are being burned, then they should not be separated by more than ¼".

In the following estimates of furnace performance, coke has been used as the example fuel. If another fuel such as lignite is used, then the B.t.u.'s provided per ton of product must be the same. This means that there will be a much larger volume of lignite, which is only about one-half the bulk density of coke and has about two-third the B.t.u. value per pound. There will, therefore, be more particles of lignite present to satisfy the required conditions for proper operation and it will, therefore, be easier to satisfy the proximity factor by keeping particles of lignite within one diameter of each other in the mixture.

This proximity factor leads to quite different choices of fuel than would be expected by one skilled in the art. There are real advantages on this basis to the use of lignite, petroleum coke and other low density solid fuels such as char.

In the following table examples are given of operating conditions and calculated results for the production of metallized ore.

In Table 1 is shown the calculated performance when using an 8 ft. furnace diameter and blast volume of 8700 c.f.m. to produce metallized ore. The data is calculated for a heat consumption of 7,500 B.t.u.'s per ton of product when making 75% reduced ore from Steep Rock ore from the Steep Rock Area in Canada. The coke rate is 33.3% of the mix, required furnace height is 42' and the gas contact time is 4.6 seconds.

Only a portion of the coke is burned and the residue of 60% of the coke charge is recycled to the furnace.

Operation of the controlled combustion shaft furnace can be modified using either natural gas or liquid fuel. It is necessary to make sure that the oxidizing primary flame from the central fuel tube reacts completely with the excess envelope of secondary natural gas before contacting the charge and therefore it is particularly important that the combustion pocket in the charge be large and maintained carefully.

TABLE 1

*Controlled combustion shaft furnace metallized ore ore production data*

8 Ft. Diameter—33% Voids in charge
Blast—8700 c.f.m. Burns 3300 lbs. Coke/hr.

| | |
|---|---:|
| Fuel Consumption—B.t.u./ton product | 7,500.00 |
| Coke rate, percent of coke/ore mix | 33.3 |
| Coke volume/ore volume | 2.10 |
| Feed Rate: | |
| lbs./hr. | 16,700 |
| tons/yr. | 56,600 |
| Production: | |
| lbs./hr. | 11,700 |
| tons/yr. | 40,000 |
| Burden volume, cu. ft./100 lbs. | 1.633 |
| Burden bulk density, lb./cu. ft. | 60 |
| Product weight/cu. ft. | 28 |
| Coke lbs./cu. ft. | 20 |
| Coke burned lbs./ton product | 750 |
| Coke burned lbs./cu. ft. burden | 7.9 |
| Burden cu. ft./hr. | 418 |
| Rate of travel, ft./hr. | 8.36 |
| Furnace height, 5 hr. residence, ft. | 42 |
| Gas contact time, vel. 9 f.p.s., sec. | 4.6 |
| Residual coke: | |
| Percent of original | 60 |
| Percent of product | 40 |

From the foregoing it will be seen that the present invention provides a method and apparatus for the reduction of iron ore to metallized ore by controlling the maximum temperature reached within the annular shaft furnace through the control of size and ratio of ore and reducing material such as coke and the control of combustion air thereto, and maintaining a controlled atmosphere within the shaft furnace from the point of entry of the charge down to the point of discharge provides means for producing reduced ore to the desired degree of reduction, accordance to the use of the product.

It should be further understood that although specific methods and apparatus have been disclosed, the invention also contemplates variations in the methods and variations in design of the apparatus as may fall within the scope of the appended claims.

What I claim as my invention is:

1. A method of reducing iron ore by controlled combustion maintained within a vertical shaft furnace and comprising the steps of: adding the ore together with reduction material in the form of a charge into the top of the furnace, the reduction material being in excess of that required for complete reduction of the ore and to maintain a selected operating temperature within the furnace; adding air to said charge to burn off volatiles and gases therefrom and to provide a pre-heat zone for said charge at the top end of said furnace; controllably adding preheated air to said furnace below said pre-heat zone to combust a portion of said reduction material to provide a reduction zone having a $CO/CO_2$ ratio of about 7:1 and an operating temperature of about 2,000° F.; passing said charge within the furnace firstly through said pre-heat zone and secondly through said reduction zone at a rate to control the desired degree of reduction of the ore to iron; maintaining the reducing ore charge in a cooling zone within said furnace below said reduction zone to cool the charge to a temperature of about 400° F.; forcing about 5% of the reducing gases from said reduction zone down through said cooling zone to maintain a non-oxidizing atmosphere during cooling of the reduced ore charge; removing said reduced ore charge from the bottom of the furnace and separating the iron from the left over reduction material.

2. A method of reducing iron ore as claimed in claim 1 wherein the step of forcing reducing gases down through said cooling zone is done by the method of first forcing preheated air into said reducing zone at a pressure in excess of that of ambient, and providing a pressure at the top of the furnace greater than ambient but less than that in said reducing zone whereby most of the reducing gases are drawn up through the charge within the furnace and a small portion of the reducing gases is forced downwardly through said cooling zone to escape at the bottom of the furnace and prevent the entry of air.

3. A method of reducing iron ore as claimed in claim 1 wherein the exces of reduction material is from one-third to two-thirds the total of reduction material added to the top of the furnace.

4. A method of reducing iron as claimed in claim 1 wherein the spacing between adjacent particles of reduction material is about equal to the average such particle diameter.

5. The method as claimed in claim 4 wherein the reduction material is selected from the group consisting of lignite, petroleum coke and char.

6. The method according to claim 1 where the ratio of largest to smallest particle size used for the charge is about 2:1.

7. A low temperature blast furnace for reducing iron ore to metallized ore and comprising: a shell defining a shaft furnace of predetermined height and diameter; a plurality of concentric annular refractory linings of successively reduced inner diameter pyramided one on top of the other within said shell to provide a plurality of zones each of reduced diameter relative to the previous zone and decreasing in diameter towards the top of the furnace; means introducing combustion air about the periphery of the furnace at the steps formed by said refractories; a concentrically oriented air tube extending at least partly the length of said furnace to provide communication of gases into said zones and from one zone to another within the furnace, said tube and said linings defining an annular charge space; and means controlling the flow of air into said furnace to maintain a pressure greater than ambient and to provide a downward flow of part of gases generated within said furnace during operation thereby to control the atmosphere within said furnace.

8. A low temperature blast furnace as claimed in claim 7 wherein said central tube is of a diameter of between $1/10$ to $1/2$ the inside diameter of said furnace at the combustion zone.

References Cited

UNITED STATES PATENTS

| 607,501 | 7/1898 | Byram | 266—30 |
| 665,432 | 1/1901 | Hardh | 266—30 X |
| 1,289,834 | 12/1918 | Longyear et al. | 266—30 X |
| 2,793,946 | 5/1957 | Paschal | 266—29 X |

JAMES W. WESTHAVER, *Primary Examiner.*

U.S. Cl. X.R.

75—90; 263—29